Figure 1:
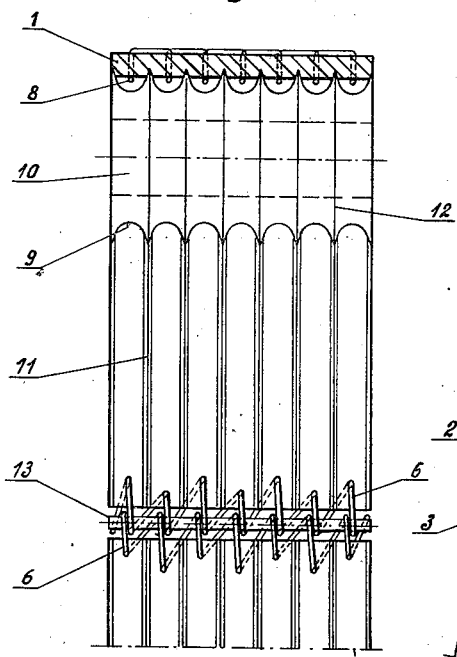

Aug. 24, 1943.  E. MAIER  2,327,729

WIRE BELT JOINT

Filed Sept. 8, 1939

INVENTOR
EMILIO MAIER
BY *Richards & Geier*
ATTORNEYS

Patented Aug. 24, 1943

2,327,729

UNITED STATES PATENT OFFICE 2,327,729

WIRE BELT JOINT

Emilio Maier, Ramos Mejia, Argentina

Application September 8, 1939, Serial No. 293,931
In Argentina August 10, 1938

2 Claims. (Cl. 24—39)

The present invention refers to improvements in belt drives. The latter, as is known, suffer still from many a disadvantage, all the more so when small pulleys, reduced angle of lap and great transmission ratios are concerned.

More particularly, trouble in belt drives is caused by belt joints. Even a joint made by simple cementing gives rise to trouble in that the overlapped portion grows hard whereby it reduces the adhesion coefficient of the belt and increases the possibility of breakage of the same. If the belt, in addition to being cemented, is laced, these factors will turn out still worse. Combined cementing and lacing not only give rise to bumps, irregular travel and slips of the belt, and reduction of the number of revolutions at the moment when the overlapped portion passes over the small pulley, but also result in a quick wear of the lace and in the destruction of the belt joint proper.

However, all of these disadvantages make themselves felt in a twofold manner when a belt joint is to be made "in situ" to adapt the length of the belt to prevailing space conditions. These belt joints are known as "belt fastenings," "belt claws," etc., and they also comprise the so-called alligator fastening which is held together by a pin. While this latter belt joint, due to its hinge-like construction, has given better results than all other joints, it still has some disadvantages which may be resumed as follows: (1) decrease in the entraining bearing surface of the belt which, in the case of very small pulleys, may be a 50% diminution at the moment when the joint touches the pulley; (2) the same and even a higher decrease in the adhesion factor and the entraining capacity, this latter dwindling down to zero in the so frequent case of the small pulley being the driving one, and (3) the not less serious drawback of the projecting metal coils of the joint resting on and continuously sliding over the moving metal pulley whereby they are subjected to a wear equal to a multiple of such wear as in all safety may be considered to be the normal one.

My present invention is based on a completely novel idea for the manufacture of belt joints. Starting from the aforementioned fact that the hinged joint formed of helicoidal wires, due to its hinge-like construction, is considered to be one of the best belt joints existing since it diminishes the detrimental properties of the other belt joints, I have developed the present invention on this basis and succeeded in thereby eliminating the defects that still existed up to the present in said belt joint. This I have attained by making provision for an arrangement which completely eliminates any and all contact of the projecting metal parts of the belt joint according to my invention with the likewise metal pulley.

This arrangement consists in providing the small pulley of a belt drive with annular grooves through which the projecting parts of my novel belt joint pass without touching the pulley.

In this arrangement the projecting parts of the belt joint are distributed at regular intervals over the width of the belt. To cause these parts to always stay within the annular grooves of the pulley, the pertaining belt is also provided with grooves extending throughout its length and which register with the partitions resulting from the grooving of the pulley, the edges of the said partitions being bevelled so as to assure proper engagement thereof by the belt grooves.

It is obvious that a considerable improvement in belt drives is achieved by thus combining the belt joint, the small pulley and the belt. While the belt joint according to my present invention eliminates the principal drawbacks of known belt joints as hereinbefore pointed out under points (1) to (3), the improvement in belt drives resides in that the novel arrangement of this new belt joint makes it possible to abolish the present method of providing laced and cemented leather belts and to, in their stead, furnish belt lengths of exactly the size in which they are cut from the hide, duly classified in accordance with their thickness, width and length and equipped, or not, with the novel belt joint. In this manner, all the consumer need do to perform the joint is to couple the various lengths of belt by means of a pin.

The combination of a single length of wire with uniformly alternating passages results in that the belt will be less weakened than by other belt joints.

Figure 2:
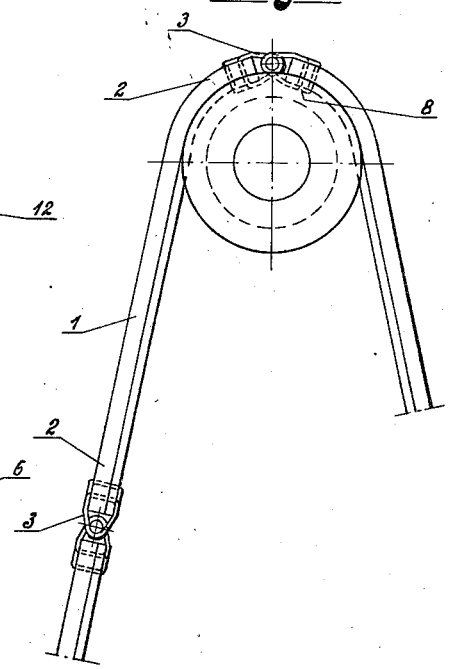
Figure 3:
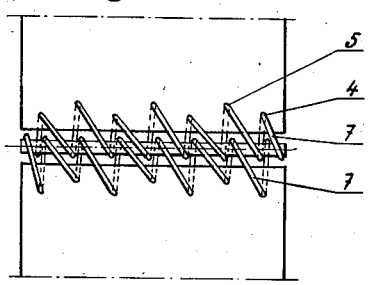

The present invention is illustrated in the accompanying drawing wherein:

Figure 1 is a cross-section of the belt showing, at the same time, the manner in which the projecting parts of the belt joint pass through the grooves of the pulley without touching the latter, Figure 2 is a front view of the pulley and the belt provided with its joint, showing how the latter passes over the pulley and what is its aspect at the running-off side, and Figure 3 shows the belt joint as seen from the outside.

According to the drawing, the belt I is provided at both ends 2 with loops 3. While these loops 3 may be similar to a helical spring, they should be arranged so as to cause them to alternately pass through the belt at a smaller and a greater distance from the end thereof, as will be appreciated from Figures 4 and 5.

However, the principal feature of this belt joint consists in that the coils 6 of the loops 3 extend without any pitch on the inner side of the belt facing the pulley, thus extending in parallel relationship with the longitudinal direction of the belt, while they extend slantingly as at 7, according to the pitch, only on the outer side of the belt.

This arrangement enables the projecting portion 8 of the joint to be guided within grooves 9 of a pulley 10 to avoid its contact with the pulley, and more particularly with small pulleys, thus attaining the purpose of the present invention.

To cause the projecting portion 8 of the belt joint to always stay within the grooves of the pulley during operation, the belt 1 is provided with longitudinal grooves 11 which engage the projecting edges 12 resulting from the grooving of the pulley 10, whereby the projecting portions 8 of the belt joint are prevented from deviating from their course within the depressions or grooves of the pulley.

When the ends 2 of the belt 1 are provided with the fastener members 7, this length of belt readily becomes endless by simply sticking the pin 13 through the said end fastener members, and any desired amount of belt lengths thus equipped with these end loops may likewise be coupled together to obtain any desired length of belt.

Having thus fully described my invention, what I claim as new and desire to secure by Letters Patent, is:

1. A joint for drive belts comprising the combination with a pair of belt ends having a series of longitudinal grooves extending along the wheel-engaging side thereof, of a pair of spiral coils forming a series of loops passing through each of the ridges formed by the grooves in said belt ends, means for hingedly interlocking said opposing sets of loops, said spiral coils being so formed that the convolutions on the grooved side of said belt ends extend longitudinally upon the ridges formed by said grooves and on the other side extend diagonally across the belt ends.

2. A joint for drive belts comprising the combination with a pair of belt ends having a series of longitudinal grooves extending along the wheel-engaging side thereof, of a pair of spiral coils forming a series of loops passing through each of the ridges formed by the grooves in said belt ends, means for hingedly interlocking said opposing sets of loops, said spiral coils being so formed that the convolutions on the grooved side of said belt ends extend longitudinally upon the ridges formed by said grooves and on the other side extend diagonally across the belt ends, the convolutions of one spiral running substantially parallel to the convolutions on the opposing spiral.

EMILIO MAIER.